Aug. 2, 1955     J. JAUQUET     2,714,266
MECHANICAL MOVING ARM FOR ADVERTISING PURPOSES
Filed Sept. 23, 1952     2 Sheets-Sheet 1
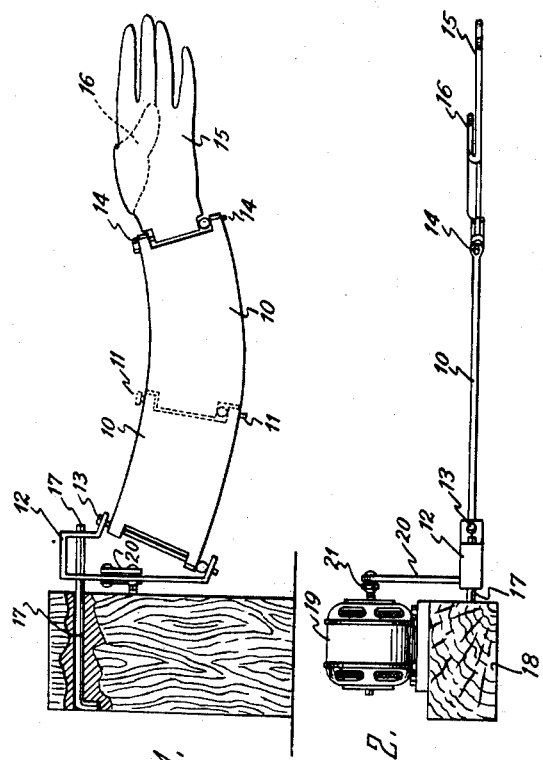
Inventor:
Juan Jauquet
by:
Michael S. Striker
agt.

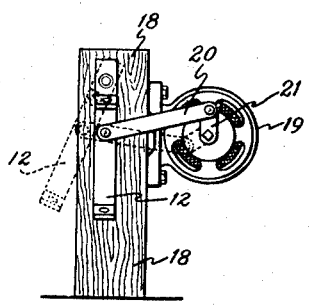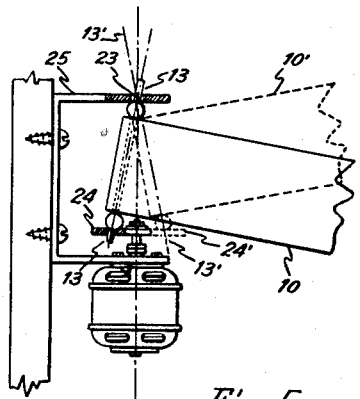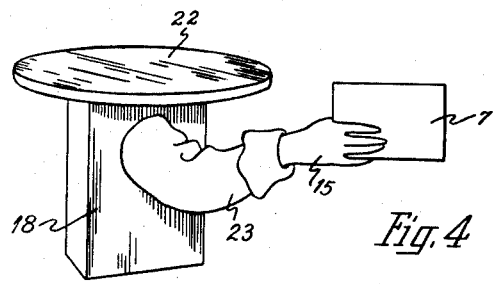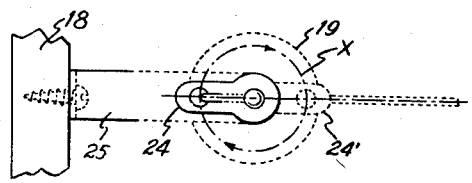

United States Patent Office

2,714,266
Patented Aug. 2, 1955

2,714,266

MECHANICAL MOVING ARM FOR ADVERTISING PURPOSES

Juan Jauquet, Mexico City, Mexico

Application September 23, 1952, Serial No. 311,083

Claims priority, application Mexico September 27, 1951

10 Claims. (Cl. 40—126)

The present invention relates to advertising apparatuses or devices, and more particularly it refers to a new and attractive animated arm, capable of mechanical movement to be used for advertising in store windows, show cases, counters, etc.

Briefly, the advertising device of the invention consists in an apparatus constituted by an arm similar to a human arm, pivotally mounted on one of its extremes and connected to a moving mechanism while a hand, or any other object desired, is pivotally mounted on the other extreme thereof. Said arm is preferably articulated in order to have greater movement, or it could be made of one piece.

The articulated hand at the end of the arm has its thumb preferably bent to form a clamp in order to hold an advertising card or sign.

In accordance with the foregoing, the principal object of the invention is to provide an animated arm for advertising purposes, fixed by one extreme to a moving mechanism and to a supporting base, and having a hand pivotally joined to the other end thereof and adapted to hold a sign or advertising card.

These and other details, objects and characteristics of the advertising device of the invention, will be made clearly apparent in the course of the following specification, as well as in the drawings that accompany it as an illustration of same and which bear the same reference numbers to indicate the same parts in the figures shown.

In these drawings:

Fig. 1 illustrates a front view of an animated arm for advertising purposes, made in accordance with the present invention, and fixed to a moving mechanism mounted on a base.

Fig. 2 is a top view of the same advertising device.

Fig. 3 is a side view of the same advertising device.

Fig. 4 is a perspective view of the advertising device of the invention, with the arm dressed, the hand holding an advertising placard, and with an exhibiting platform mounted on top of the supporting element.

Fig. 5 is a partial side view and Fig. 6 a partial top view of a different embodiment of the invention.

Before entering into a detailed description of the advertising device of this invention, as shown in the drawings, I wish it to be thoroughly understood that these express in form but not in any manner limitative, one of the preferred ways of carrying out the invention, without being limited to the specific details illustrated and described. Therefore, variations and modifications could be evolved in practice if considered necessary or convenient, without departing from the principles and sphere of the invention, and these would be within the bounds of the claims at the end of this specification.

The drawing in Fig. 1 shows an arm 10 divided in two articulated portions fastened to and freely pivotable about a pin 11. Such an arm could also be made of more than two articulated parts or be made of only one piece.

The extreme rear end of said arm 10 is pivotally mounted on a moving bracket 12, by means of an inclined pin 13 about which arm 10 freely pivots, exactly as is shown with great clarity in the Fig. 1 of the drawings. The pin 13 is preferably formed with a flat head which prevents this pin from falling through the bracket 12. A ball is preferably threaded on this pin between the lower face of the arm 10 and the bracket, which ball forms a simplified thrust bearing.

The arm 10, by its forward extremity movably supports, by means of a pin 14, a hand 15, which freely pivots about pin 14, and which eventually may be substituted by any other object of diverse form or appearance. The thumb 16 of the hand 15 illustrated in Figs. 1, 2 and 4 of the drawings, is bent in the form of a clamp, in order to hold an advertising card or sign 7, as illustrated in Fig. 4 of the drawings. The pins 11 and 14 are made, as can be clearly seen from Fig. 1 of the drawing, in exactly the same way as pin 13 and are each also provided with a ball which is interposed between the respective parts pivotally connected by these pins.

The bracket or mounting means 12, and therefore the arm 10 pivotally joined to it, can swing to and fro about the pin 17, fixed to an element of support 18 (Figs. 1 and 2 of the drawings); and said movement to and fro is transmitted by a motor or other source of energy 19, by means of the connecting rods 20 and 21. The connecting rod 20 is hinged to the central part of the bracket 12, and at its other extremity to the small connecting rod 21 which receives its movement directly from the motor 19. Fig. 3 of the drawings illustrates clearly the mechanical movement that gives a to and fro movement to the bracket 12, forming a holder of the arm 10, and the two limits of this movement may be clearly discerned.

A stationary or moving platform 22 can be arranged on top of the supporting element 18 to place thereon the article advertised on the card or placard 7.

The arm 10 is preferably dressed or covered with a sleeve 23 for the best presentation as illustrated in Fig. 4 of the drawings.

Figs. 5 and 6 show partial views of another modification according to the present invention. Only the support and moving mechanism for the arm 10 and the rear end of the same is shown in the drawings. This arm is otherwise formed in a similar manner as shown in Fig. 1 of the specification and described above. Figs. 5 and 6 show a stationary support 18 to which a U-shaped bracket 25 is attached by screws or in any convenient manner. A small motor 19 is attached adjacent to the end of the lower leg of the U-shaped bracket with its shaft substantially normal to this leg. The free end of this shaft carries a connecting rod 24 fixedly attached thereto in a position normal to the shaft. This connecting rod is provided with an opening therethrough spaced from the shaft of the motor, whereas the upper leg of the U-shaped support is also provided with an opening therethrough in line with the center line of the shaft. A pin 13 is turnably mounted in these two openings. This pin is preferably provided with two spherical formed stops which prevent not only the pin from falling through the openings, but which form also a simplified thrust bearing for the arm 10, which is with its free end turnably mounted on the pin 13.

When the mechanism shown in Figs. 5 and 6 is set in motion the lower end of the pin will move along a circular path $x$ indicated in dash-dot line in Fig. 6 and the pin 13 will move along the surface of a cone, the apex of which lies in the opening in the upper leg of the U-shaped support. The arm 10 will therefore swing up and down as can be clearly visualized from the drawings, in which the upper position of the arm 10' is indicated in dotted lines whereas as its lower position 10 is shown in full lines and the articulated parts of the arm will also turn relative to each other.

The apparatus, as already explained, is intended for advertising purposes, and could be mounted on a stationary or moving platform.

What I claim is:

1. An advertising device, comprising in combination, support means; an elongated articulated limb member extending from said support means, said limb member including a plurality of pivotally connected consecutive parts; mounting means at one end of said articulated limb member mounting said limb member on said support means, said limb member being connected to said mounting means turnably about a first axis, and said mounting means being connected to said support means for movement about a second axis inclined relative to said first axis; and moving means for moving said mounting means about said second axis so as to change the position of said first axis relative to said support means so that said articulated limb member turns about said first axis and the parts thereof turn relative to each other while said mounting means moves about said second axis.

2. An advertising device, comprising in combination, support means; an elongated articulated limb member extending substantially horizontally from said support means, said limb member including a plurality of pivotally connected consecutive parts; mounting means at one end of said articulated limb member mounting said limb member on said support means, said limb member being connected to said mounting means turnably about a first axis, and said mounting means being connected to said support means for movement about a second axis inclined relative to said first axis; and moving means for moving said mounting means about said second axis so as to change the position of said first axis relative to said support means, so that said articulated limb member turns about said first axis and the parts thereof turn relative to each other while said mounting means moves about said second axis.

3. An advertising device, comprising in combination, support means; an elongated articulated limb member extending from said support means, said limb member including a plurality of pivotally connected consecutive parts; mounting means at one end of said articulated limb member mounting said limb member on said support means, said limb member being connected to said mounting means turnably about a first axis, and said mounting means being connected to said support means for movement about a substantially horizontal second axis inclined relative to said first axis; and moving means for oscillating said mounting means about said second axis so as to change the position of said first axis relative to said support means, so that said articulated limb member turns about said first axis and the parts thereof turn relative to each other while said mounting means moves about said second axis.

4. An advertising device, comprising in combination, support means; an elongated articulated limb member extending from said support means, said limb member including a plurality of pivotally connected consecutive parts; mounting means at one end of said articulated limb member mounting said limb member on said support means, said limb member being connected to said mounting means turnably about a first axis, and said mounting means being connected to said support means for movement in a conical surface of revolution about a second axis inclined relative to said first axis; and moving means for moving said mounting means in said conical surface of revolution about said second axis so as to change the position of said first axis relative to said support means, so that said articulated limb member turns about said first axis and the parts thereof turn relative to each other while said mounting means moves about said second axis.

5. An advertising device, comprising in combination, support means; an elongated articulated limb member extending from said support means, said limb member including a plurality of pivotally connected consecutive parts turnable relative to each other about axes inclined relative to each other in a substantially vertical plane; mounting means at one end of said articulated limb member mounting said limb member on said support means, said limb member being connected to said mounting means turnably about a first axis, and said mounting means being connected to said support means for movement about a substantially horizontal second axis inclined relative to said first axis; and moving means for oscillating said mounting means about said second axis so as to change the position of said first axis relative to said support means, so that said articulated limb member turns about said first axis and the parts thereof turn relative to each other while said mounting means moves about said second axis.

6. An advertising device, comprising in combination, support means; an elongated articulated limb member extending substantially horizontally from said support means, said limb member including a plurality of pivotally connected consecutive parts; mounting means at one end of said articulated limb member mounting said limb member on said support means, said limb member being connected to said mounting means turnably about a first axis, and said mounting means being connected to said support means for movement in a conical surface of revolution about a substantially vertical second axis inclined relative to said first axis; and moving means for moving said mounting means in said conical surface of revolution about said second axis so as to change the position of said first axis relative to said support means, so that said articulated limb member turns about said first axis and the parts thereof turn relative to each other while said mounting means moves about said second axis.

7. An advertising device, comprising in combination, support means; an elongated articulated arm member extending from said support means, said arm member including a plurality of pivotally connected consecutive parts and having a pivotable hand member at the end thereof remote from said support means; mounting means at the opposite end of said articulated arm member mounting said arm member on said support means, said arm member being connected to said mounting means turnably about a first axis, and said mounting means being connected to said support means for movement about a second axis inclined relative to said first axis; and moving means for moving said mounting means about said second axis so as to change the position of said first axis relative to said support means, so that said articulated arm member turns about said first axis and the parts thereof turn relative to each other while said mounting means moves about said second axis.

8. An advertising device, comprising in combination, support means; an elongated articulated arm member extending from said support means, said arm member including a plurality of pivotally connected consecutive parts and having a pivotable hand member at the end thereof remote from said support means; holding means on said hand member for holding advertising matter so as to display the same; mounting means at the opposite end of said articulated arm member mounting said arm member on said support means, said arm member being connected to said mounting means turnably about a first axis, and said mounting means being connected to said support means for movement about a second axis inclined relative to said first axis; and moving means for moving said mounting means about said second axis so as to change the position of said first axis relative to said support means, so that said articulated arm member turns about said first axis and the parts thereof turn relative to each other while said mounting means moves about said second axis.

9. An advertising device, comprising in combination, support means; an elongated articulated arm member extending substantially horizontally from said support means, said arm member including a plurality of pivotally connected consecutive parts turnable relative to each other about axes inclined relative to each other in a substantially vertical plane and having a pivotable hand member at the end thereof remote from said support means; holding means on said hand member for holding advertising matter so as to display the same; mounting means at the opposite end of said articulated arm member mounting said arm member on said support means, said arm member being connected to said mounting means turnably about a first axis, and said mounting means being connected to said support means for movement about a substantially horizontal second axis inclined relative to said first axis; and moving means for oscillating said mounting means about said second axis so as to change the position of said first axis relative to said support means, so that said articulated arm member turns about said first axis and the parts thereof turn relative to each other while said mounting means moves about said second axis.

10. An advertising device, comprising in combination, support means; an elongated articulated arm member extending substantially horizontally from said support means, said arm member including a plurality of pivotally connected consecutive parts turnable relative to each other about axes inclined relative to each other in a substantially vertical plane and having a pivotable hand member at the end thereof remote from said support means; holding means on said hand member for holding advertising matter so as to display the same; mounting means at the opposite end of said articulated arm member mounting said arm member on said support means, said arm member being connected to said mounting means turnably about a first axis, and said mounting means being connected to said support means for movement in a conical surface of revolution about a substantially vertical second axis inclined relative to said first axis; and moving means for moving said mounting means in said conical surface of revolution about said second axis so as to change the position of said first axis relative to said support means, so that said articulated arm member turns about said first axis and the parts thereof turn relative to each other while said mounting means moves about said second axis.

References Cited in the file of this patent

UNITED STATES PATENTS

| | | |
|---|---|---|
| 535,202 | Hawes | Mar. 5, 1895 |
| 1,201,913 | Arnold | Oct. 17, 1916 |
| 2,509,535 | Selover | May 30, 1950 |